W. H. BAILEY.
WHEEL-TIRE.
No. 179,253. Patented June 27, 1876.
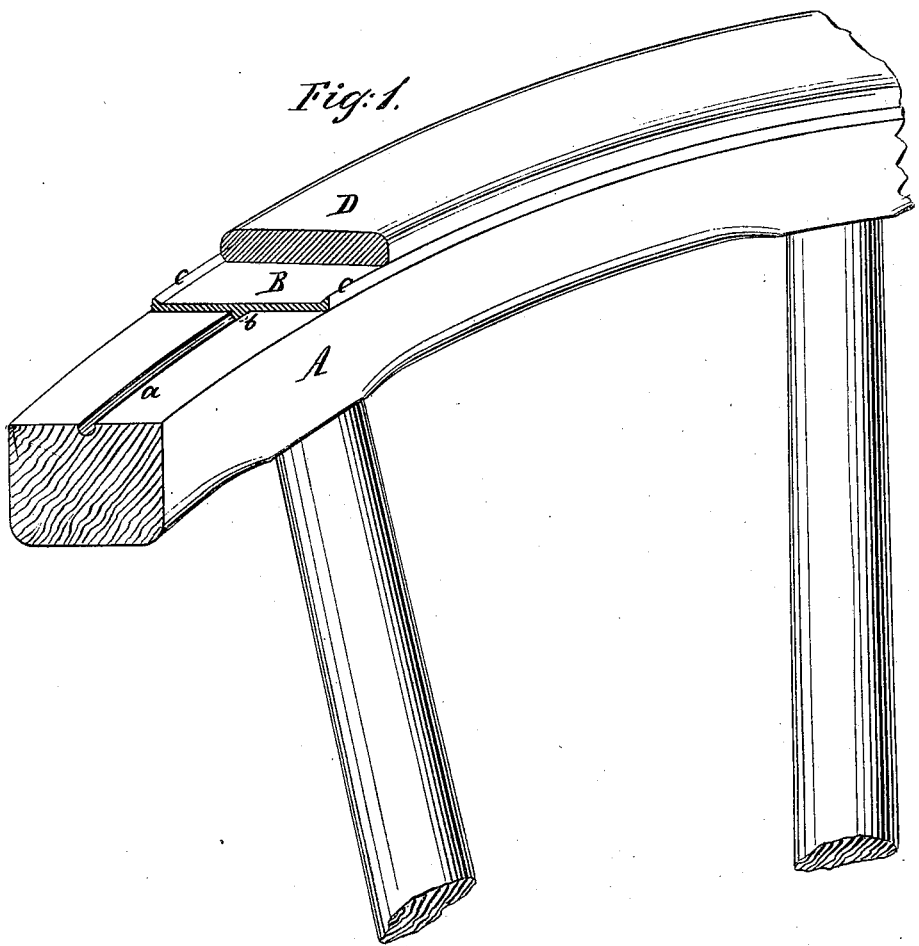
Fig. 1.
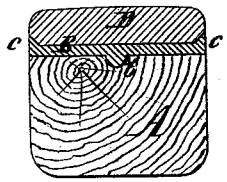 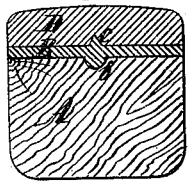
Fig. 2.  Fig. 3.
Witnesses:  
Chas. E. Boughter  
M. R. Ryan
Inventor:  
William H. Bailey

UNITED STATES PATENT OFFICE.

WILLIAM H. BAILEY, OF NEW YORK, N. Y.

IMPROVEMENT IN WHEEL-TIRES.

Specification forming part of Letters Patent No. 179,253, dated June 27, 1876; application filed May 15, 1876.

*To all whom it may concern:*

Be it known that I, WILLIAM H. BAILEY, of the city, county, and State of New York, have invented a new and useful Improvement in Wheel-Tires for Vehicles; and I hereby declare the following to be a full, clear, and exact description thereof, reference being had to the accompanying drawing, forming a part of this specification, in which—

Figure 1 is a perspective view of a portion of a wheel, showing the construction and arrangement of the several parts composing my invention. Fig. 2 is a cross-section, and Fig. 3 a modification illustrating an equivalent means for securing the outer elastic tire or band.

My invention consists in constructing a rolled tire with beveled flanges arranged upon its outer periphery to support and retain an elastic band, and a circumferential rib arranged centrally and opposite the depression provided for the elastic band, whereby the strength of the tire is preserved in cross-section, all as hereinafter described and claimed.

In the drawing, A represents a portion of a felly provided with a groove, $a$. B is a metallic tire, constructed with a rib or projection, $b$, corresponding to and fitting within the groove $a$, and also provided with beveled flanges $c\ c$ upon its external surface, as shown. This tire is made by passing a bar or blank of metal between rolls, having their working-surfaces formed to correspond to and produce the configuration shown on the opposite surfaces of said tire.

This process of rolling bar-iron or other metals to any desired form in cross section is well understood by metal-workers, and needs no further explanation.

The tire can, therefore, be as cheaply produced and placed upon the market for this purpose as ordinary bar-iron.

The rib $b$ serves to prevent lateral displacement of the tire, and insures greater strength to the same in cross-section, and thus avoids the common danger of fracture. The use of bolts and screws is dispensed with, and consequently all danger of splitting or weakening the felly is avoided. The depth or size of the rib $b$ should be proportionate to the variation in the diameter of the tire, caused by heating in the process of applying it to a wheel, to allow it to pass on to the felly and be firmly seated, without unusual strain, when shrunk.

D is an elastic band of any desired thickness, which may be regulated according to the kind of vehicle to which it is intended to be applied, and which may be constructed of any suitable elastic material, rubber being preferred, which may be vulcanized or treated by any well-known process to render it durable. It is applied to the wheel by springing it over the flanges $c\ c$, it being formed in a complete circle when molded, and its natural elasticity retains it in place. The object of the elastic band is to protect the tire from the constant battering it receives, especially in cities, when running over cobble-stone pavements, or in crossing railroad-tracks, the effect of this being to draw out or elongate the tire, and consequently loosen it; and, in crossing a railroad-track diagonally or turning out from the groove of the same, the elastic band prevents the wheel from sliding along the rail, which causes great strain upon the running-gear.

The modification of the form of tire shown in Fig. 3 consists in arranging the outer flanges centrally, instead of at the edges; but I prefer the latter construction, as the flanges protect the edges of the elastic band, and prevent foreign substances from working between it and the tire.

Having thus fully described my invention, what I claim, and desire to secure by Letters Patent, is—

1. The inwardly-beveled flanges $c\ c$, arranged upon the outer periphery of the tire, to retain and support the elastic band, as set forth.

2. The combination of the felly A, having groove $a$, the tire B, having rib $b$ and beveled flanges $c\ c$, and the elastic band D, substantially as described.

WILLIAM H. BAILEY.

Witnesses:
M. R. ROGERS,
CHAS. E. BOUGHTER.